Figure 1:
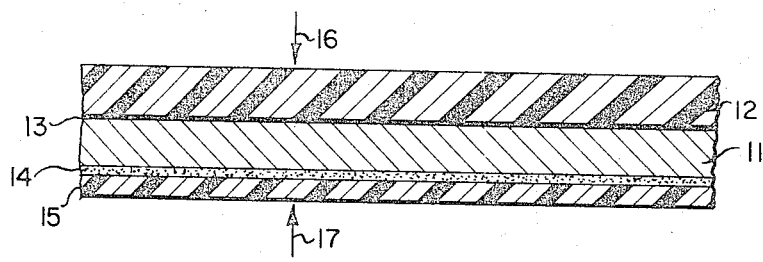

March 14, 1967     J. BORACK     3,309,257

COLOR CHANGEABLE EMBOSSABLE LAMINATE

Filed Oct. 22, 1963

*INVENTOR.*
JOSEPH BORACK

*BY*

Nilsson, Robbins & Anderson
ATTORNEYS

United States Patent Office 3,309,257
Patented Mar. 14, 1967

3,309,257
COLOR CHANGEABLE EMBOSSABLE LAMINATE
Joseph Borack, Beverly Hills, Calif., assignor to Tapeprinter, Inc., a corporation of Delaware
Filed Oct. 22, 1963, Ser. No. 317,918
1 Claim. (Cl. 161—6)

This invention relates generally to embossing of plastic material and more particularly to an article of manufacture adapted for cold flow embossment.

The characteristic of certain plastic materials to change color and become white in appearance when they have been subjected to viscoelastic deformation, i.e. cold flow, is well known in the prior art. Examples of such plastic materials are unplasticized polyvinyl chloride, polyvinyl chloride-polyvinyl acetate copolymers, impact polystyrene, polypropylene and the like. Such unplasticized plastic materials are commonly referred to as rigid plastic materials. It has also been recognized in the prior art that such material when placed in sheet or strip form can be utilized and is especially suitable for the manufacture of labels, identification tags, decorative plaques, and other similar applications.

If desired, such material can be reinforced by laminating it with a very thin sheet of reinforcing material such as fabric, fibre, plastic cloth, or the like which is held in place against the rigid plastic material by the utilization of an adhesive layer.

Although the material thus manufactured in accordance with the prior art has been quite successful for the purpose intended, certain inherent disadvantages and limitations result from the utilization of such material.

One such inherent limitation is that the background color utilized particularly for such items as labels or tags made from embossed tapes is applied by way of painting on the back surface of the plastic tape to be embossed. It has been discovered from experience with such plastic tapes that the color that is thus applied as background color has a great tendency to fade thus causing the color contrast between the embossed area and the remainder of the tape to be substantially reduced. This problem becomes particularly acute in those applications where the tape is applied to material that is incompatible with the paint which provides the background color.

Another of the inherent disadvantages encountered by the users of the prior art embossable tape is the high gloss finish on the surface thereof. Such a finish reflects an unusual amount of light and thus causes the letters or other indicia embossed upon the tape to become almost indistinguishable.

It has also been noted that the prior art tapes are relatively stiff and appear to retain a "memory" as to the particular curvature previously imparted as a result of being wound upon a roll or cartridge prior to being embossed. As a result of this retained "memory" the prior art tapes have a great tendency to separate from the objects to which they have been attached by "popping off."

Furthermore it has been noted that the prior art tapes have not been particularly adapted for use in decorative manners as a result of the background being a paint applied to the back surface of the plastic material.

Accordingly it is an object of the present invention to provide an embossable plastic member which presents an embossed surface capable of being more easily and readily distinguishable than heretofore possible with prior art assemblies.

Another object of the present invention is to provide an embossable plastic member having greater color contrast between the embossed area and the background color area and also which retains the background color for indefinite periods of time.

Another object of the present invention is to provide an embossable plastic member capable of presenting a predetermined background design for enhancement of the embossed pattern.

Another object of the present invention is to provide an embossable plastic member which remains affixed to objects to which it has been applied after long periods of time.

Additional objects and advantages of the present invention will become apparent from a consideration of the following description taken in conjunction with the accompanying drawing which is presented by way of example and is not intended as a limitation upon the scope of the present invention as defined in the appended claim and in which:

The three figures each schematically illustrate in cross section an alternative embodiment of an embossable plastic member in accordance with the present invention.

In accordance with one aspect of the present invention there is provided an article for cold flow embossment which includes a layer of flexible material which carries a coloring agent upon at least one surface thereof. A layer of transparent rigid plastic material having a structure such that it will change colors upon being subjected to cold flow deformation, for example through embossing, is affixed to the layer of flexible material in such a manner that the coloring agent shows through the transparent plastic material and operates as a background color therefor.

It has been found that with the foregoing structure the prior art difficulties above referred to have been overcome. There is for example provided a very strong embossable plastic article which produces a pure white letter against a background color that can be made extremely vivid and which will retain its color characteristics irrespective of the application in which the embossed article is utilized.

In accordance with a more specific aspect of the present invention the embossable article is constructed of a layer of non-ferrous metallic foil such as aluminum which carries a coloring agent on one surface thereon. The layer of transparent rigid plastic such as for example polyvinyl chloride is bonded to the colored surface of the aluminum foil to provide a permanent structure consisting of layers of substantially the same thickness of aluminum foil and clear plastic. The opposite side of the aluminum is then coated with a pressure-sensitive adhesive and a detachable backing to protect the pressure-sensitive adhesive until it is ready for use.

From the foregoing it should be recognized that what is provided in accordance with the present invention is a base layer which can be any sheet material that is flexible, which can be deformed substantially without rupturing, which is capable of receiving and retaining the pressure-sensitive adhesive which is applied thereto on one surface thereof and which will also receive and retain a top coating layer of the transparent rigid plastic material which is to provide the white embossed indicia as a result of the cold flow deformation thereof.

In accordance with still another specific aspect of the present invention the base layer and the top coating layer may be constructed of a plastic material. In such instances the base layer is constructed of elastomeric (sometimes referred to as plasticized) plastic material. The base layer may carry the coloring agent by having a pigment dispersed throughout or placed only upon the surface thereof as desired. Where the pigment is dispersed throughout, the top coating layer of rigid plastic material is preferably calendared with the base layer to provide a bonded structure. The calendaring rolls are so constructed and the calendaring operation carried out as to provide the surface of the top coating layer with a dull substantially non-reflective surface.

In addition to the foregoing the base layer may also be constructed of fabric, paper, fibre, asbestos, or other similar materials.

Various specific examples of the articles manufactured in accordance with the present invention are illustrated in the drawing to which reference is hereby made.

As is illustrated in FIG. 1 one embodiment of an article manufactured in accordance with the present invention includes a base layer 11 of a metallic foil and preferably a non-ferrous metallic foil. Examples of such materials are brass, copper, lead and aluminum, and preferably the base layer is constructed of an aluminum foil. The metallic foil 11 may vary in thickness from between 0.0025 and 0.0045 inch and where aluminum is used preferably is approximately 0.0045 inch in thickness. A top coating layer 12 of transparent rigid plastic material is affixed to the upper surface of the aluminum foil 11 in such a manner that it is permanently bonded thereto. As above described the top coating layer 12 of transparent or clear rigid plastic material may be of various types. The critical criterion for the material is that it must be capable upon being deformed beyond its elastic limit, that is subjected to cold flow, and as a result thereof change color so that a white appearance is presented to the eye in the thus stressed areas.

If desired, the aluminum foil base layer 11 may have one surface thereof provided with a coloring agent 13 to provide a background color to present a sharp contrast between the white embossed indicia and the background for such indicia after embossment of the article in accordance with the present invention has taken place. When the base layer 11 is of aluminum foil the coloring agent 13 can readily be provided by anodizing one surface of the aluminum foil 11.

Alternatively the color may be imparted to the surface of the foil by providing a layer of thermoplastic material having a pigment dispersed therein. The thermoplastic material must be compatible with the top coating layer of rigid plastic. Where the color is provided by anodizing the surface of aluminum foil it is sometimes desirable to coat the anodized surface with a layer of clear thermoplastic material. Thereafter the transparent rigid top coating is placed upon the thermoplastic coat and heat and pressure are applied for a time and to a degree sufficient to fuse the top coating to the thermoplastic coat thus bonding the base layer and the top coating permanently together.

A layer of pressure-sensitive adhesive 14 is sandwiched between the base layer 11 and a protective backing material 15 which is detachably releasable from the pressure-sensitive adhesive 14. An example of such a detachable protective backing layer is a very thin layer of polyethylene plastic material. It has been found that the polyethylene plastic material has less affinity for the typical pressure-sensitive adhesives which are well known to the prior art than does the aluminum foil base layer 11. Therefore the release of the polyethylene protective layer 15 without disturbing the pressure-sensitive adhesive 14 is assured.

The article of the present invention as illustrated in FIG. 1 is embossed by applying pressure thereto as indicated by the opposed arrows 16, 17 through the medium of an embossing machine either hand-operated or otherwise in such a manner that selected areas of the entire structure as illustrated in FIG. 1, and constructed in accordance with the present invention, is subjected to substantial deformation. The article, however, is deformed short of the point of rupturing. This deformation causes the structure of the top coating layer 12 to change by an amount sufficient to cause the area which has been deformed, that is subjected to the cold flow, to change color and cause a substantially white appearance to be presented. After the article is thus embossed in the desired manner, the protective backing layer 15 is removed and the article is applied to the desired surface with the pressure-sensitive adhesive 14.

Figure 2:
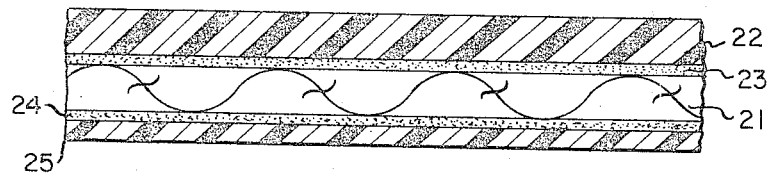

Referring now more particularly to FIG. 2 an alternative embodiment of an article constructed in accordance with the present invention is presented. As is therein illustrated, the base layer is constructed of a layer of fabric 21 and the top coating layer 22 is a layer of transparent rigid plastic material of the type above referred to. The top coating layer 22 of transparent rigid plastic material is bonded to the base layer 21 of fabric by means of a layer of pressure-sensitive adhesive 23. The layer of pressure-sensitive adhesive 23 is applied to the top surface of the base layer 21 in any manner well known to the prior art. The top coating layer 22 is then applied to the adhesive 23 and the subassembly thus constructed is subjected to pressure and depending upon the pressure-sensitive adhesive being utilized some heat may be applied to thus effect a permanent bonding between the base layer 21 and the top coating 22. There is thus provided a permanently bonded structure of a base layer and a top coating layer. Alternatively a layer of thermoplastic material could be used as the bonding medium as above described. A pressure-sensitive adhesive 24 is then applied to the opposite surface of the base layer 21 and is protected by a protective backing 25 as above described.

In constructing an article in accordance with the present invention as illustrated in FIG. 2, it should be noted that the coloring agent which is carried by the top surface of the base layer consisting of the fabric 21 can be a pigment that has been included within the adhesive 23 or the thermoplastic coat which is used to bond the top coating layer 22 to the base layer 21. Alternatively, the base layer 21 can be impregnated with a pigment to provide a color which will contrast with the white color presented by the rigid plastic material after it has been embossed.

Figure 3:
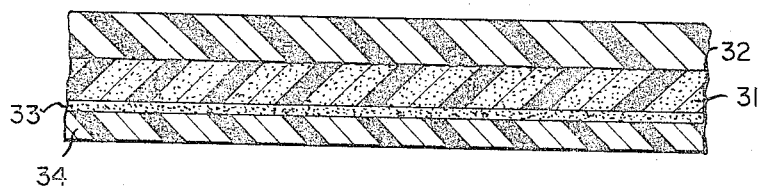

Referring now more particularly to FIG. 3, there is illustrated another alternative embodiment of an article manufactured in accordance with the present invention. As is illustrated in FIG. 3, a base layer 31 of plastic material is provided and has permanently bonded thereto a top coating 32 of clear rigid plastic material. The base layer of plastic material 31 is constructed of a plasticized plastic material having a greater degree of flexibility. The coloring agent which is provided and carried by the base layer 31 is preferably a pigment which has been homogeneously dispersed throughout the base layer 31 as is illustrated by the plurality of dots therein thus providing a contrasting color for the embossed portions of the top coating layer 32 after the cold flow deformation thereof.

As is illustrated by the lack of a distinct separating line between the base layer 31 and the top coating layer 32, the two layers 31 and 32 may be permanently bonded by calendaring in such a manner that the two layers are fused together thus providing a unitary structure having a colored base layer and a clear top coating layer. As in the two alternative embodiments above described, a layer of pressure-sensitive adhesive 33 is applied to the opposite side of the base layer and is protected by a protective backing 34 which can be detached leaving the pressure-sensitive adhesive 33 intact and affixed to the base layer 31.

In accordance with the presently preferred embodiment of the present invention where both the base layer and the top coating layer are constructed of plastic, it is preferably polyvinyl chloride plastic material. Furthermore a great deal of flexibility is provided the end product by utilizing an elastomeric base layer for the rigid top coating layer. It has been found that a high degree of flexibility is thus maintained and the article when applied to the desired surface will not have any tendency to "pop off."

Although a particular means of permanently bonding the base layer and the top coating layer has been described in conjunction with each of the foregoing embodiments, it should be understood that in each instance the top coating layer can be subjected to a calendaring operation to remove the high gloss finish therefrom thus providing a rather flat finish that does not reflect a great deal of light. In this manner the indicia which is embossed into the top coating layer and in accordance with techniques well known in the prior art, is more readily distinguishable by the user.

It should also be noted that the top surface of the base layer may have a design which is decorative in nature applied thereto, either by stamping, engraving, embossing, printing, or otherwise depending upon the material from which the base layer is manufactured. In those instances where an adhesive is utilized to permanently bond the base layer and the top coating layer and where the base layer has some such design placed thereon, it is desirous to utilize an adhesive material which is transparent so the decorative design will not be in any manner obscured thereby.

In each instance the top coating layer in the alternative embodiments above referred to is preferably on the order of .0045 to .005 inch in thickness.

There has thus been disclosed several embodiments of an article of manufacture which is capable of being embossed to provide a white indicia resulting from cold flow of a rigid plastic material upon a permanent color contrasting background which indicia is more readily recognized and is more permanent in application.

What is claimed is:

Strip material of the type which when subjected to embossing pressures sufficient to effect cold flow deformation changes color and is adaptable for use as a label, said strip material comprising:

(A) first and second layers of thermoplastic solid sheet material permanently fuse bonded together solely by the application of heat and pressure thereto to form an integral member,
   (1) said first layer consisting of a layer of transparent rigid thermoplastic solid sheet material,
   (2) said second layer consisting of a layer of plasticized thermoplastic solid sheet material which is substantially flexible as compared to said first layer thereby to control the overall flexibility of said strip material to prevent a label formed therefrom from separating from a surface to which it is applied;

(B) a pressure sensitive adhesive coated on the exposed surface of said second layer for affixing said strip material after embossing to a desired surface; and (C) a detachably releasable protective backing material covering said adhesive coating, said first and second layers and said backing material being cold flow deformable without rupturing.

References Cited by the Examiner

UNITED STATES PATENTS

| | | | |
|---|---|---|---|
| 2,648,924 | 8/1953 | Brewster | 117—36.7 X |
| 2,883,315 | 4/1959 | Palmquist. | |
| 2,996,822 | 8/1961 | Souza | 161—2 X |
| 3,036,945 | 5/1962 | Souza | 161—120 X |
| 3,047,443 | 7/1962 | Anderson | 161—406 X |
| 3,048,510 | 8/1962 | Wisotzky | 161—413 X |
| 3,049,459 | 8/1962 | Smith et al. | 161—3 |
| 3,096,596 | 7/1963 | Magnuson et al. | 161—2 X |
| 3,198,688 | 8/1965 | Yoder. | |

ALEXANDER WYMAN, *Primary Examiner.*

W. POWELL, *Assistant Examiner.*